April 23, 1929.  J. A. McGREW  1,710,372
TRACTOR TRUCK GEARING

Original Filed July 8, 1925

INVENTOR
John A. McGrew.
BY R. S. A. Dougherty
a. B. Reavis
ATTORNEYS

Patented Apr. 23, 1929.

1,710,372

UNITED STATES PATENT OFFICE.

JOHN A. McGREW, OF ALBANY, NEW YORK, ASSIGNOR TO BETHLEHEM STEEL COMPANY.

TRACTOR-TRUCK GEARING.

Application filed July 8, 1925, Serial No. 42,160. Renewed March 9, 1929.

My invention relates to automatically connectible and disconnectible power transmitting mechanism for connecting a source of power to a driven element, for example, to tumbler gear mechanism for connecting and disconnecting an auxiliary motor with respect to a load bearing axle, and it has for an object to provide means to assure connection and disconnection of the tumbler gear in consequence of movement of the auxiliary motor.

A further object of my invention is to provide, in connection with driving and driven gears and a tumbler gear, the latter being constantly in mesh with the driving gear and capable of being translated for entrainment and disentrainment with respect to the driven gear, an escapement mechanism for initially restraining rotary movement of the tumbler gear about its axis, whereby, upon movement of the driving gear in one direction, the tumbler gear will be translated in an entraining direction in order to be brought into meshing relation with respect to the driven gear and which, upon the tumbler gear being demeshed from the driven gear and moving in a disentraining direction, engages the tumbler gear to hold the latter for subsequent operation.

These and other objects are accomplished by my invention as will be evident from a consideration of the following specification and of the accompanying drawings, forming a part of this application, in which.

Figure 1:
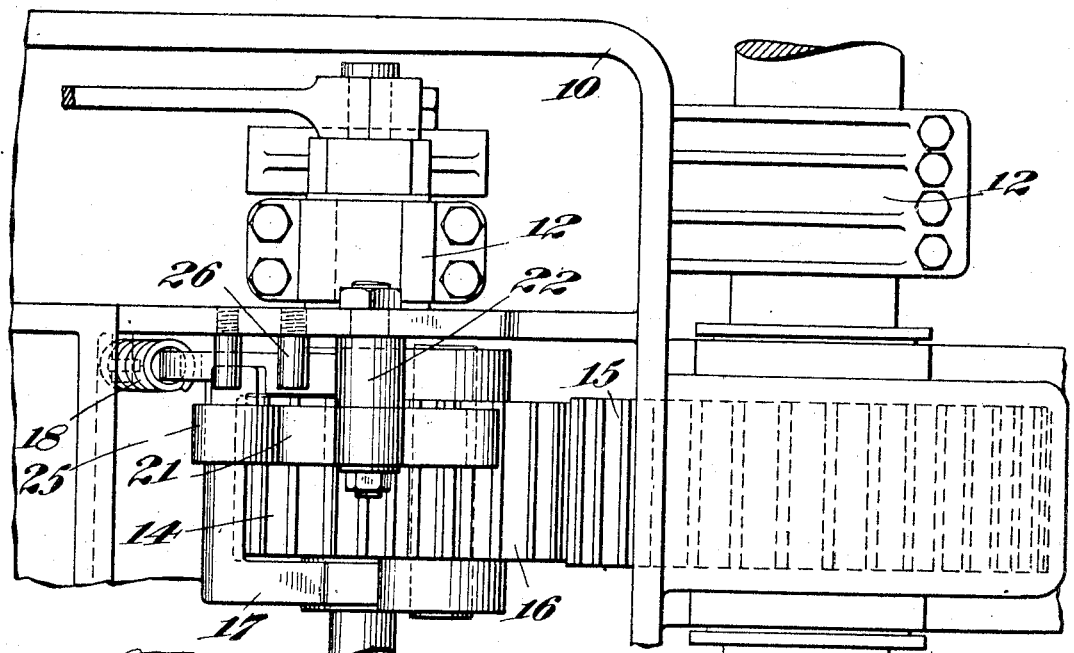
Fig. 1 is a detail fragmentary view showing apparatus with my improvement applied thereto.

Referring now to the drawings more in detail, I show a frame or support 10 having a driving shaft or member 11 journaled therein, and the frame or support 10 has journal bearings 12, which fit the driven shaft or axle 13. The frame or support 10 carries engine or motor cylinders (not shown) which drive the driving shaft 11, and the shaft or axle 13 is preferably one of the load-bearing axles of a locomotive tender truck.

The driving and driven shafts, 11 and 13, respectively, are journaled with respect to the support or frame 10 in parallel relation, and these shafts carry driving and driven toothed gears 14 and 15, respectively. A tumbler gear 16 meshes constantly with the driving gear 14 and it is maintained in this relation by a frame or tumbler support 17. The frame or support 17 is capable of angular movement with respect to the axis of the driving gear in order to move the tumbler gear 16 to entrain and disentrain the latter with respect to the driven gear 15. A spring 18 has one end thereof connected to the frame 17 and its other end anchored to the support 10 and it serves normally to bias the frame 17 in a disentraining direction.

Figure 2:
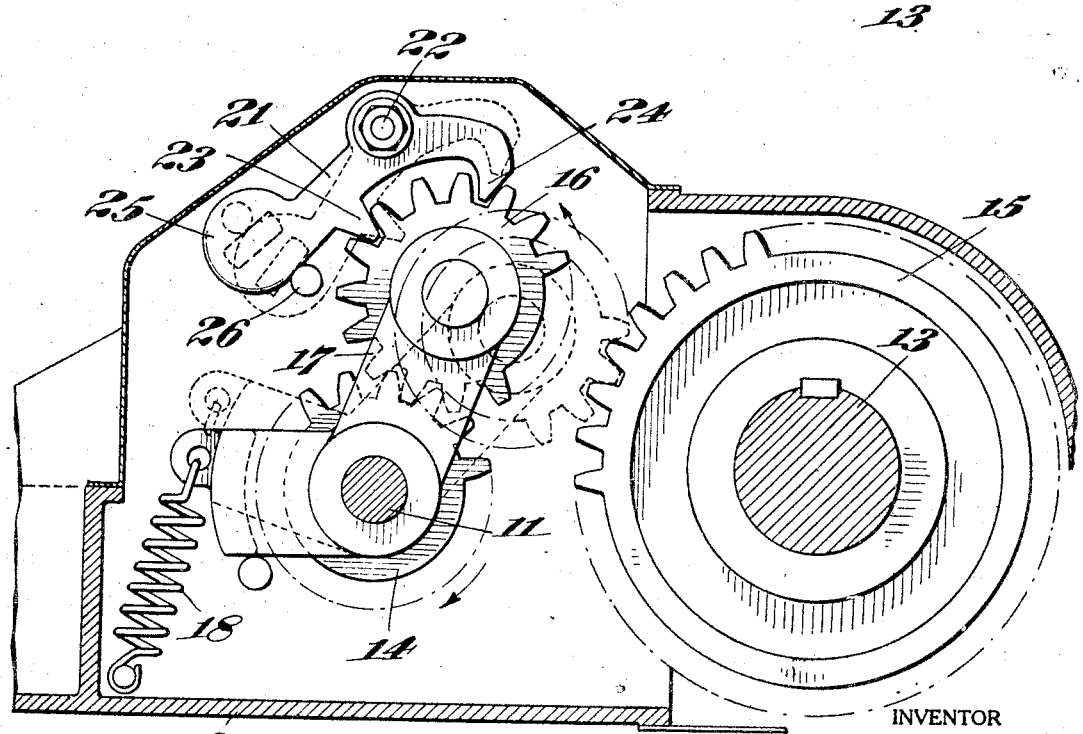
Fig. 2 is a vertical sectional view showing my improvement.

In order that the tumbler gear may be moved in an entraining direction, it is necessary that rotation thereof about its axis be restrained; and to this end, I show an escapement 21 pivoted, at 22, with respect to the support 10 and having teeth 23 and 24 normally engaged between teeth of the tumbler gear 16 when the latter occupies its disentrained position, as indicated in full lines in Fig. 2. The pivot 22 is arranged above or beyond the teeth 23 and 24 in order that the escapement may readily tilt as hereinafter set forth. The escapement member has the end thereof remote from the driven gear weighted, as indicated at 25, for a purpose to be immediately described.

When the driving gear 14 is turned in the direction of the arrow shown in Fig. 2, the tumbler gear 16 is restrained from rotation about its axis due to engagement of the escapement teeth 23 and 24 between the teeth thereof. Consequently the frame 17 and the tumbler gear 16 are moved in an entraining direction; and, while movement takes place in this direction, the escapement 21 tilts about its axis 22 in a direction opposite angularly to the entraining movement. In consequence of this, the teeth 23 and 24 act in succession on the tumbler gear 16 and such teeth are preferably not fully disengaged from the tumbler gear until teeth of the latter are initially engaged between teeth of the driven gear 15. From the arrangement of gearing shown, it will be apparent that it is only necessary for the tips of the teeth of the tumbler gear to first engage between the tips of the teeth of the driven gear and that thereafter the relative arrangement of gears and the directions of rotation thereof are such as to cause the tumbler gear to move completely into mesh with the driven gear. Although I prefer to have the tumbler gear engaged by the escapement teeth until this initial engagement of the tumbler gear teeth with the driven gear teeth takes place, it will be apparent that disengagement of the escapement teeth might take place before engagement of the tumbler gear with the driven gear for the reason that the tumbler gear and its frame are moving in an entraining direction and inertia effects are amply sufficient to overcome the spring 18 and to secure enmeshment of the tumbler gear 16 with the driven gear 15.

The weighted end 25 secures reverse angular movement of the escapement 21 while the tumbler is being entrained in the manner first referred to and such angular movement is limited by a stop 26 so as to assure that, when the tumbler gear 16 is meshed with the driven gear 15, the escapement will be maintained out of contact with the tumbler gear and the tooth 24 thereof will occupy such a position that, when the tumbler gear and its support 17 move in a disentraining direction, such tooth will be initially engaged by the tumbler gear and the escapement will be tilted about its axis 22 until both teeth 23 and 24 are fully engaged between teeth of the tumbler gear 16, when the latter and its frame 17 occupy a normal disentrained position with the frame 17 engaging the stop 19, as shown in full lines in Fig. 2.

While I have shown and while I prefer to use an escapement or pawl device having a pair of teeth, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

Having thus described the invention what I claim as new and desire to secure by Letters Patent is:

1. In an apparatus of the character described, the combination of a support or frame, driving and driven toothed gears rotatable about axes which are fixed with respect to the frame, a tumbler toothed gear constantly in mesh with the driving gear, and a member movable angularly about an axis fixed with respect to the frame and having a tooth for engaging between teeth of the tubular gear for restraining rotation of the latter, whereby the tumbler gear is translated in a direction to mesh with the driven gear when the driving gear is moved in one direction.

2. In apparatus of the character described, the combination of a support or frame, driving and driven toothed gears rotatable about axes which are fixed with respect to the frame, a tumbler toothed gear constantly in mesh with the driving gear, and a member rotatable angularly about an axis fixed with respect to the frame and having a plurality of teeth for engagement between teeth of the tumbler gear for restraining rotation of the latter, whereby the tumbler gear is translated in a direction to mesh with the driven gear when the driving gear is turned in one direction.

3. In apparatus of the character described, the combination of a support or frame, driving and driven members journaled in said support or frame, driving and driven tooth gears carried by the driving and driven members respectively, a toothed tumbler gear constantly in mesh with the driving gear, and a member pivoted with respect to the frame and having a tooth fitting between teeth of the tumbler gear for restraining rotation of the latter, whereby the tumbler gear is translated in a direction to mesh with the driven gear when the driving gear is turned in one direction.

4. In apparatus of the character described, the combination of a support or frame, driving and driven toothed gears rotatable about axes which are fixed with respect to the frame, a toothed tumbler gear, an angularly movable frame for supporting the tumbler gear with the teeth thereof constantly in mesh with the driving gear, a member movable about an axis fixed with respect to the support and having a tooth for engagement between teeth of the tumbler gear for restraining rotation of the latter, whereby the tumbler gear is translated in a direction to mesh with the driven gear, and means for normally biasing the tumbler gear frame in a direction to move the tumbler gear away from the driven gear.

5. In apparatus of the character described, the combination of a support or frame, driving and driven toothed gears rotatable about axes which are fixed with respect to the frame, a toothed tumbler gear, an angularly movable frame for supporting the tumbler gear with the teeth thereof constantly in mesh with the driving gear, a member movable about an axis fixed with respect to the support and having a tooth for engagement between teeth of the tumbler gear for restraining rotation of the latter, whereby the tumbler gear is translated in a direction to mesh with the driven gear, means for normally biasing the tumbler gear frame in a direction to move the tumbler gear away from the driven gear, and means for limiting movement of the frame in the latter direction.

6. In apparatus of the character described, the combination of a support, driving and driven members journaled in place with respect to the support, driving and driven gears carried by the driving and driven members respectively, a tumbler gear constantly in mesh with the driving gear, and an escapement member having teeth engaging between teeth of the tumbler gear for restraining rotation of the latter about its axis, whereby the tumbler gear is translated in a direction to mesh with the driven gear when the driving gear is turned in one direction.

7. In apparatus of the character described, the combination of a support or frame, driving and driven members journaled in place with respect to the support or frame, driving and driven gears carried by the driving and driven members respectively, a tumbler gear constantly in mesh with the driving gear, an escapement carried by the support or frame and having teeth for engagement between teeth of the tumbler gear to restrain rotation of the latter about its axis, whereby the tumbler gear is translated in a direction to mesh with the driven gear when the driving gear is turned in one direction, and means for biasing the escapement to tilt angularly in a direction opposite to the angular movement of the tumbler gear in moving in a meshing direction, whereby the teeth of the escapement are disengaged from the teeth of the tumbler gear when the latter is meshed with the driven gear and one of the teeth of the escapement is in position to be engaged by the tumbler gear when the latter is moved angularly in a demeshing direction.

8. In apparatus of the character described, the combination of a support or frame, driving and driven members journaled in place with respect to said support or frame, driving or driven gears carried by the driving and driven members respectively, a tumbler gear constantly in mesh with the driving gear and movable angularly with respect to the axis of the driving gear to be entrained and disentrained with respect to the driven gears, means for normally biasing the tumbler gear for angular translatory movement in a disentraining direction, an escapement pivoted to the support or frame and having a pair of teeth for engagement between teeth of the tumbler gear for restraining rotation of the latter about its axis, whereby the tumbler gear is translated in an entraining direction when the driving gear is turned in one direction, and means for causing the escapement to turn about its axis angularly in an opposite direction to the direction of entrainment while the tumbler gear is moving in an entraining direction, and means for limiting angular movement of the escapement member, whereby, when the tumbler gear is meshed with the driven gear the teeth thereof are free from the escapement teeth and one of the teeth of the escapement is in a position for initial engagement by teeth of the tumbler gear when the latter moves in a disentraining direction in order to tilt the escapement to cause both teeth thereof to engage between teeth of the tumbler gear.

9. In apparatus of the character described, the combination of a support or frame, driving and driven members journaled in place with respect to said support or frame, driving or driven gears carried by the driving and driven members respectively, a tumbler gear, an angularly movable frame for supporting the tumbler gear and maintaining the latter constantly in mesh with the driving gear, spring means tending to move the frame angularly to move the tumbler gear in a disentraining direction with respect to the driven gear, an escapement pivoted to the support and having a pair of teeth for engagement between teeth of the tumbler gear when the latter is in disentraining position for restraining rotation thereof about its axis, whereby the tumbler gear is translated in an entraining direction to mesh with the driven gear when the driving gear is turned in one direction, and weight means carried by the escapement for causing the latter to tilt angularly in a direction opposite to the angular movement of the tumbler gear and its frame while the tumbler gear is moving in an entraining direction, and means for limiting such angular movement of the escapement, whereby the tooth thereof adjacent to the weighted end will be in a position to be initially engaged by teeth of the tumbler gear when the latter moves in a disentraining direction in order to tilt the escapement to engage both teeth thereof between teeth of the tumbler gear when the latter occupies its normal disentrained position.

In testimony whereof I hereunto affix my signature this 20th day of June, 1925.

JOHN A. McGREW.